(12) United States Patent
Nishioka et al.

(10) Patent No.: US 10,962,344 B2
(45) Date of Patent: Mar. 30, 2021

(54) MEASURING JIG, MEASURING DEVICE, AND GAP MEASURING METHOD

(71) Applicant: Mitsubishi Hitachi Power Systems, Ltd., Kanagawa (JP)

(72) Inventors: Yasunori Nishioka, Kanagawa (JP); Takuro Kameda, Kanagawa (JP); Masahito Kataoka, Kanagawa (JP); Hitoshi Morimoto, Kanagawa (JP); Tetsu Konishi, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 348 days.

(21) Appl. No.: 16/096,472

(22) PCT Filed: May 9, 2017

(86) PCT No.: PCT/JP2017/017569
§ 371 (c)(1),
(2) Date: Oct. 25, 2018

(87) PCT Pub. No.: WO2017/199795
PCT Pub. Date: Nov. 23, 2017

(65) Prior Publication Data
US 2019/0137251 A1  May 9, 2019

(30) Foreign Application Priority Data
May 19, 2016  (JP) .............................. JP2016-100244

(51) Int. Cl.
*G01B 5/14* (2006.01)
*G01B 21/00* (2006.01)
*G01B 21/16* (2006.01)

(52) U.S. Cl.
CPC ............... *G01B 5/14* (2013.01); *G01B 21/00* (2013.01); *G01B 21/16* (2013.01)

(58) Field of Classification Search
CPC .................................. G01B 5/14; G01B 21/16
(Continued)

(56) References Cited

U.S. PATENT DOCUMENTS 4,950,986 A   8/1990 Guerrero
5,152,166 A  10/1992 Brock et al.
(Continued)

FOREIGN PATENT DOCUMENTS

JP     4-217447    8/1992
JP    11-62471     3/1999
(Continued)

OTHER PUBLICATIONS

Korean Office Action dated Jul. 26, 2019 in corresponding Korean Application No. 10-2018-7030044 with Machine Translation.
(Continued)

*Primary Examiner* — George B Bennett
(74) *Attorney, Agent, or Firm* — Wenderoth, Lind & Ponack, L.L.P.

(57) ABSTRACT

A measuring jig includes: a base portion; a sensor holding portion disposed so as to protrude from the base portion and configured to hold a sensor; and a first protruding portion protruding from the base portion toward the same side as the sensor holding portion, at a first position different from a sensor position which is a position of a sensor installation surface on which the sensor extends, with respect to a direction orthogonal to the sensor installation surface.

18 Claims, 14 Drawing Sheets

(58) Field of Classification Search
USPC .......................................................... 33/542
See application file for complete search history.

(56) References Cited

U.S. PATENT DOCUMENTS

| | | | | |
|---|---|---|---|---|
| 5,625,958 | A * | 5/1997 | DeCoursey | G01B 5/205 33/1 BB |
| 5,657,550 | A * | 8/1997 | Struble | G01B 5/14 33/544.4 |
| 2004/0148793 | A1* | 8/2004 | Holder | F01D 5/005 33/562 |
| 2007/0271807 | A1* | 11/2007 | Karwowski | G01B 3/18 33/828 |
| 2010/0043576 | A1 | 2/2010 | Craig | |
| 2015/0096183 | A1* | 4/2015 | Laflen | G01B 3/26 33/531 |
| 2016/0052756 | A1* | 2/2016 | Yamasue | B66F 3/24 254/93 R |
| 2016/0076868 | A1* | 3/2016 | Feuillard | G01B 21/047 33/833 |

FOREIGN PATENT DOCUMENTS

| | | |
|---|---|---|
| JP | 2003-315020 | 11/2003 |
| JP | 2011-508880 | 3/2011 |

OTHER PUBLICATIONS

Chinese Office Action dated Nov. 29, 2019 in corresponding Chinese Patent Application No. 201780025451.2 with Machine Translation.

International Preliminary Report on Patentability and Written Opinion of the International Searching Authority dated Nov. 20, 2018 in International (PCT) Application No. PCT/JP2017/017569 with English translation.

International Search Report dated Aug. 1, 2017 in International (PCT) Application No. PCT/JP2017/017569.

* cited by examiner

MEASURING JIG, MEASURING DEVICE, AND GAP MEASURING METHOD

TECHNICAL FIELD

The present disclosure relates to a measuring jig, a measuring device, and a gap measuring method.

BACKGROUND ART

In various machines, to maintain the size of a gap between members appropriately, the size of the gap is measured.

For instance, Patent Document 1 discloses providing a displacement sensor for a gas turbine, between rotor blades and a casing, and measuring the gap between the rotor blades and the casing (tip clearance).

CITATION LIST

Patent Literature

Patent Document 1: US Patent Application Publication No. 2010/0043576

SUMMARY

Problems to be Solved

To measure the gap between the members accurately, it is important to locate the measurement sensor reliably in the gap to be measured, and maintain the attitude of the measurement sensor with respect to the members forming the gap.

In this regard, Patent Document 1 discloses fixing a measuring device with a sensor to a member forming the gap to be measured, by screwing a screw formed on the measuring device into a threaded hole formed on the member.

However, it is desirable to be able to maintain the attitude of the measurement sensor with respect to the member forming the gap, with a more simplified configuration.

In view of the above, an object of at least one embodiment of the present invention is to provide a measuring jig, a measuring device, and a gap measuring method, whereby it is possible to measure the gap between the members accurately with a simple configuration.

Solution to the Problems (1) According to at least one embodiment of the present invention, a measuring jig includes: a base portion; a sensor holding portion disposed so as to protrude from the base portion and configured to hold a sensor; and a first protruding portion protruding from the base portion toward the same side as the sensor holding portion, at a first position different from a sensor position which is a position of a sensor installation surface on which the sensor extends, with respect to a direction orthogonal to the sensor installation surface.

With the above configuration (1), the measuring jig includes a sensor holding portion and a first protruding portion protruding toward the same side from the base portion, at different positions of the base portion. Thus, when the sensor holding portion is inserted in the gap between two members to be measured, it is possible to cause the first protruding portion to be in contact with one of the two members, which makes it easier to maintain the attitude of the sensor held by the sensor holding portion with respect to the member. Thus, with the above configuration (1), it is possible to measure the gap between the members accurately, through a simple configuration of providing the first protruding portion protruding from the base portion toward the same side as the sensor holding portion.

(2) In some embodiments, in the above configuration (1), the measuring jig includes: a movable piece disposed so as to be capable of being displaced with respect to the base portion; and at least one biasing unit configured to bias the movable piece toward an opposite side to the first position across the sensor position, in the direction orthogonal to the sensor installation surface.

With the above configuration (2), when the movable piece is brought into contact with one of the members forming the gap to be measured, the position of the movable piece is restricted by the member, and the base portion is pressed in a direction away from the member by a biasing force of the biasing unit (direction toward the other one of the members forming the gap). As a result, the sensor holding portion disposed so as to protrude from the base portion becomes pressed against the other one of the members forming the gap. Accordingly, by pressing the sensor holding portion of the measuring jig against the other member, it is possible to maintain the attitude of the sensor held by the sensor holding portion with respect to the other member more reliably.

(3) In some embodiments, in the above configuration (2), the at least one biasing unit includes a pair of biasing units which are parallel to a protruding direction of the sensor holding portion from the base portion when projected on the sensor installation surface, and positioned on opposite sides of a line passing through a center position of the sensor.

With the above configuration (3), the pair of biasing units are disposed across the line that passes the center position of the sensor and is parallel to the protruding direction of the sensor holding portion, and thereby it possible to prevent partial contact of the sensor holding portion with the member, and retain the sensor in an appropriate attitude with respect to the member.

(4) In some embodiments, in the above configuration (2) or (3), the at least one biasing unit includes a helical torsion spring disposed around a line which is parallel to the sensor installation surface and which is orthogonal to a protruding direction of the sensor holding portion from the base portion, and the helical torsion spring includes a first arm having a tip portion as the movable piece.

With the above configuration (4), with the helical torsion spring being the biasing unit and the movable piece, it is possible to provide a measuring jig of a simple configuration.

(5) In some embodiments, in the above configuration (4), the helical torsion spring further includes: a second arm disposed opposite to the first arm; and a coil portion positioned between the first arm and the second arm. The first arm includes: a root portion extending from the coil portion toward an opposite side to the first position across the sensor position; and the tip portion bended toward the sensor position with respect to the root portion.

With the above configuration (5), the first arm (movable piece), which is a free end of the helical torsion spring, includes a root portion extending from the coil portion toward the opposite side to the first position across the sensor position, and a tip portion bended toward the sensor position from the root portion. That is, the first arm has a bended shape such that the tip portion escapes toward the sensor position. Thus, when inserting the sensor holding portion into the gap to be measured, the first arm is less likely to be caught on the surface of the member forming the gap, and it is possible to insert the sensor holding portion smoothly into the gap.

(6) In some embodiments, in the above configuration (4) or (5), the helical torsion spring includes a second arm disposed opposite to the first arm. The base portion includes a reactive-force receiving surface configured to be in contact with the second arm and receive a reactive force of an elastic force of the helical torsion spring.

With the above configuration (6), by receiving the reactive force of the elastic force of the helical torsion spring with the reactive-force receiving surface being in contact with the second arm, it is possible to apply the elastic force (biasing force) of the helical torsion spring to the first arm reliably, when the first arm (movable piece) is caused to be in contact with one of the members forming the gap to be measured. Accordingly, by the elastic force (biasing force) of the helical torsion spring, it is possible to press the sensor holding portion reliably in a direction away from the one of the members (direction toward the other one of the members forming the gap), together with the base portion. Thus, by pressing the sensor holding portion of the measuring jig against the other member reliably, it is possible to maintain the attitude of the sensor held by the sensor holding portion with respect to the member more reliably.

(7) In some embodiments, in the above configuration (6), the measuring jig further includes a spring-force adjusting portion for moving the reactive-force receiving surface and adjusting a position of the first arm as the movable piece in a natural state of the helical torsion spring.

With the above configuration (7), with the spring-force adjusting portion, it is possible to adjust the position of the first arm when the helical torsion spring is in a natural state. Thus, by using the spring-force adjusting portion to adjust the position of the first arm to a position suitable for the size of the gap to be measured, it is possible to obtain an appropriate pressing force from the member being in contact with the first arm when the spring-force adjusting portion is inserted in the gap to be measured. Accordingly, it is possible to maintain the attitude of the sensor held by the sensor holding portion with respect to the member more reliably.

(8) In some embodiments, in any one of the above configurations (4) to (7), the measuring jig further includes a spring position determining portion for determining a position of a center of the helical torsion spring.

With the configuration (8), it is possible to restrict the position of the center of the helical torsion spring by using the spring-position determining portion. Accordingly, it is possible to obtain a pressing force stably from the member being in contact with the first arm, and maintain the attitude of the sensor held by the sensor holding portion with respect to the member more reliably.

(9) In some embodiments, in any one of the above configurations (1) to (8), the measuring jig further includes a second protruding portion protruding from the base portion toward the same side as the sensor holding portion, at a second position different from the sensor position and the first position, in the direction orthogonal to the sensor installation surface.

With the above configuration (9), the second protruding portion protruding toward the same side as the sensor holding portion from the base portion is disposed in the second position different from the sensor position and the first position. Thus, by bringing the first protruding portion and the second protruding portion into contact with one of the two members forming the gap, it is possible to maintain the attitude of the sensor held by the sensor holding portion with respect to the member more easily.

(10) In some embodiments, in any one of the above configurations (1) to (9), the first protruding portion includes a magnet.

With the above configuration (10), the first protruding portion includes a magnet, and thus it is possible to attract the member forming the gap to be measured with the magnet. Accordingly, it is possible to maintain the attitude of the sensor held by the sensor holding portion with respect to the member more reliably.

(11) In some embodiments, in the above configurations (1) to (10), the measuring jig further includes a protruding-amount adjusting portion for adjusting a protruding amount of the first protruding portion from the base portion.

With the above configuration (11), with the protruding-amount adjusting portion, it is possible to adjust the protruding amount of the first protruding portion from the base portion in accordance with the shape of the member on which the sensor holding portion is disposed. Accordingly, it is possible to maintain the attitude of the sensor held by the sensor holding portion with respect to the member more reliably. Further, in this way, it is possible to appropriately measure the sizes of gaps formed by members that have different shapes.

(12) In some embodiments, in any one of the above configurations (1) to (11), the first position exists on an opposite side to the sensor position across a gravity center of the measuring jig, in the direction orthogonal to the sensor installation surface.

With the above configuration (12), the first protruding portion protrudes from the first position that exists on the opposite side to the sensor position across the gravity center of the measuring jig. Accordingly, the distance to the first protruding portion from the contact point between the sensor holding portion and one of the members forming the gap to be measured becomes relatively large, and thus, around the contact point, it is possible to cancel the moment due to the weight of the measuring jig with the moment due to the force of pushing the first protruding portion back from the one of the members. Thus, it is possible to stabilize the attitude of the measuring jig even further.

(13) In some embodiments, in any one of the above configurations (1) to (12), the sensor holding portion is configured to, while being inserted in a gap between a first member and a second member to be measured by the sensor, make contact with a portion of the first member which faces the second member. The first protruding portion is configured to make contact with the first member and adjust an attitude of the sensor holding portion with respect to the portion of the first member.

With the above configuration (13), a portion of the first member that faces the second member is in contact with the sensor holding portion, and the first protruding portion is in contact with the first member, thereby adjusting the attitude of the sensor holding portion with respect to the portion of the first member that faces the second member. Accordingly, it is possible to measure the gap formed between the first member and the second member accurately.

(14) According to at least one embodiment of the present invention, a measuring device includes: the measuring jig according to any one of the above (1) to (13); and a sensor held on the sensor holding portion of the measuring jig.

With the above configuration (14), the measuring jig includes a sensor holding portion and a first protruding portion protruding toward the same side from the base portion, at different positions of the base portion. Thus, when the sensor holding portion is inserted in the gap between two members to be measured, it is possible to cause the first protruding portion to be in contact with one of the two members, which makes it easier to maintain the attitude of the sensor held by the sensor holding portion with respect to the member. Thus, with the above configuration (14), it is possible to measure the gap between the members accurately, through a simple configuration of providing the first protruding portion protruding from the base portion toward the same side as the sensor holding portion.

(15) In some embodiments, in the above configuration (14), the measuring jig includes at least one protruding portion protruding from the base portion toward the same side as the sensor holding portion, at a different position from the sensor position with respect to a direction orthogonal to the sensor installation surface. The sensor holding portion is configured to, while being inserted in a gap between a first member and a second member to be measured by the sensor, make contact with a portion of the first member which faces the second member. The measuring device further includes a contact detecting portion for detecting contact between the first member and at least one protruding portion of the at least one protruding portion.

According to the above configuration (15), with the contact detecting portion, it is possible to detect contact between the projecting portion of the measuring jig and the first member forming the gap to be measured, and thus it is possible to measure the gap, while confirming that the protruding portion of the measuring jig is in contact with the first member. Thus, with the above configuration (15), it is possible to measure the gap accurately and more reliably.

(16) In some embodiments, in the above configuration (15), the contact detecting portion includes an image capturing portion configured to capture an image of a tip portion of the at least one protruding portion and a portion of the first member facing the tip portion of the at least one protruding portion.

With the above configuration (16), by capturing an image of the contact portion between the tip portion of the protruding portion and the first member by using the image-capturing portion, it is possible to measure the gap while confirming that the protruding portion is in contact with the first member. Thus, it is possible to measure the gap accurately and more reliably.

(17) In some embodiments, in the above configuration (15) or (16), the contact detecting portion includes a contact sensor configured to detect contact between a tip portion of the at least one protruding portion and a portion of the first member facing the tip portion of the at least one protruding portion.

With the above configuration (17), by detecting the contact portion between the tip portion of the protruding portion and the first member with the contact sensor, it is possible to measure the gap while confirming that the protruding portion is in contact with the first member. Thus, it is possible to measure the gap accurately and more reliably.

(18) According to at least one embodiment of the present invention, a gap measuring method includes: a step of causing a sensor mounted to a measuring jig to enter a gap between a first member and a second member, and measuring a size of the gap with the sensor. The measuring jig includes: a base portion; a sensor holding portion disposed so as to protrude from the base portion and configured to hold the sensor; and a first protruding portion protruding from the base portion toward the same side as the sensor holding portion, at a first position different from a sensor position which is a position of a sensor installation surface on which the sensor extends, with respect to a direction orthogonal to the sensor installation surface. The step of measuring the size of the gap includes causing the sensor holding portion to make contact with a portion of the first member which faces the second member, and performing measurement by the sensor in a state where the first protruding portion is in contact with the first member.

The measuring jig used in the above method (18) includes a sensor holding portion and a first protruding portion protruding toward the same side from the base portion, at different positions of the base portion. Thus, when the sensor holding portion is inserted in the gap between the first member and the second member to be measured, it is possible to cause the first protruding portion to be in contact with the first member, which makes it easier to maintain the attitude of the sensor held by the sensor holding portion with respect to the first member. Thus, according to the above method (18), it is possible to measure the gap between the first member and the second member accurately, through a simple configuration of providing the first protruding portion protruding from the base portion toward the same side as the sensor holding portion.

Advantageous Effects

According to at least one embodiment of the present invention, it is possible to provide a measuring jig, a measuring device, and a gap measuring method, whereby it is possible to measure the gap between the members accurately with a simple configuration.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Figure 1:
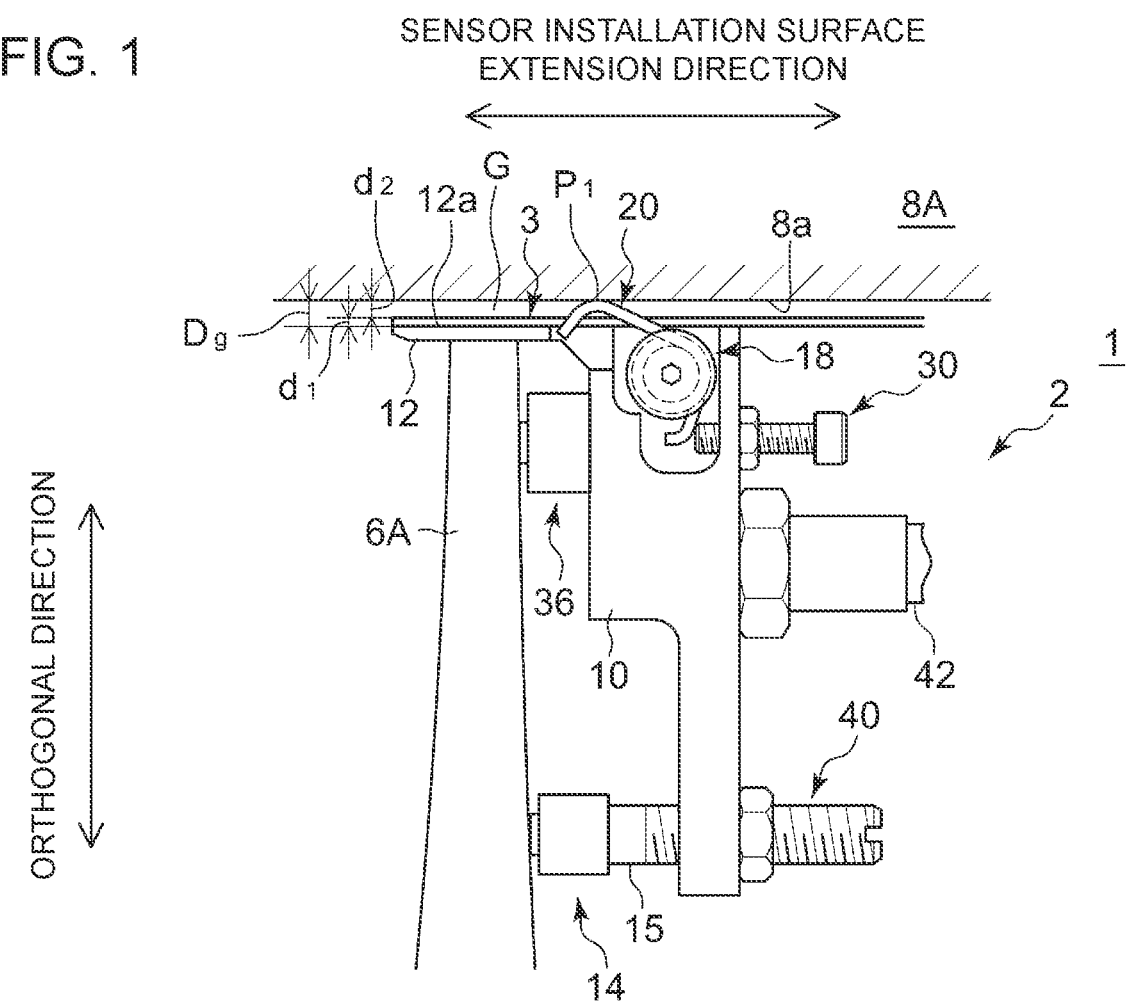
FIG. 1 is a schematic diagram of an application example of a measuring device according to an embodiment.
Figure 2:
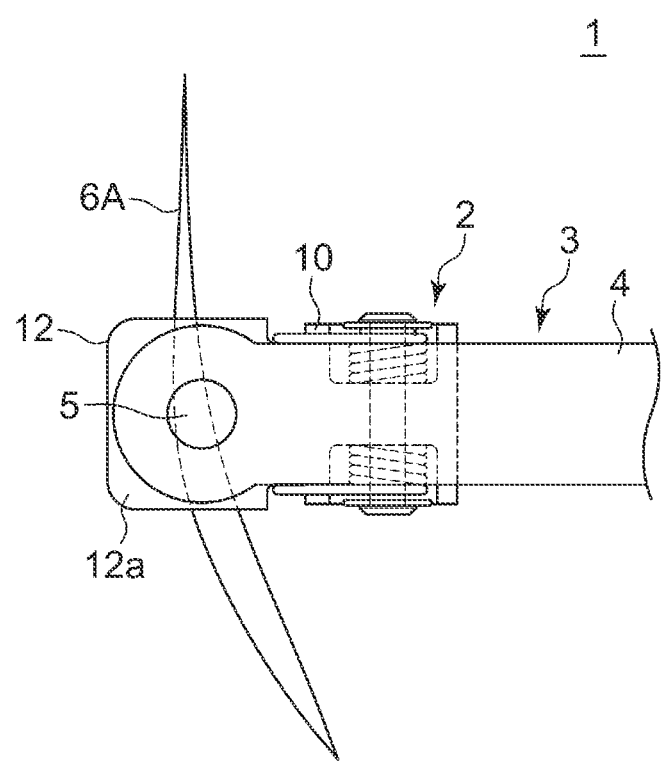
FIG. 2 is a schematic diagram of an application example of a measuring device according to an embodiment.

FIGS. 1 and 2 are each a schematic diagram of an application example of a measuring device according to an embodiment. In FIGS. 1 and 2, a measuring device 1 is depicted, which is to be applied to measurement of the size Dg of the gap (tip clearance) G between a rotor blade 6A of a gas turbine, which is the first member 6, and a casing 8A of the gas turbine, which is the second member 8.

Further, FIG. 1 is a view of the measuring device 1 as seen along the blade surface direction of the rotor blade 6A, and FIG. 2 is a view of the measuring device 1 as seen from the tip side toward the root side of the rotor blade 6A.

As depicted in FIG. 1, the measuring device 1 includes a sensor 3, and a measuring jig 2 for holding the sensor 3.

As depicted in FIG. 2, the sensor 3 includes an arm portion 4, and a sensor portion 5 mounted to the tip portion of the arm portion 4. The sensor portion 5 is configured to detect the distance to an object that faces the sensor portion 5. The sensor 3 may be a capacitance sensor or an optical sensor.

As depicted in FIGS. 1 and 2, the measuring jig 2 includes a base portion 10, and a sensor holding portion 12 and a first protruding portion 14 disposed so as to protrude from the base portion 10. The sensor 3 is disposed on a sensor installation surface 12a of the sensor holding portion 12, and is held on the sensor holding portion 12.

The first protruding portion 14 protrudes from the base portion 10 toward the same side as the sensor holding portion 12, at the first position (see FIG. 3) different from the position of the sensor installation surface 12a (sensor position; see FIG. 3) in the direction orthogonal to the sensor installation surface 12a (i.e., to the direction of extension of the sensor installation surface).

The first protruding portion 14 of the measuring jig 2 depicted in FIGS. 1 and 2 includes a part of the shaft portion and the head portion of a bolt 15 screwed with a threaded hole formed on the base portion 10.

In an embodiment, an installation unit (e.g. flexible arm) for installing the measuring device 1 on a predetermined position may be mounted to the base portion 10.

To measure the gap between the rotor blade 6A and the casing 8A by using the above described measuring device 1, firstly, the sensor holding portion 12 of the measuring jig 2 and the sensor 3 held by the sensor holding portion 12 are inserted into the gap G between the rotor blade 6A and the casing 8B.

Next, while the sensor 3 and the sensor holding portion 12 are inserted in the gap G, the sensor holding portion 12 is caused to be in contact with a portion of the rotor blade 6A that faces the casing 8A (tip surface of the rotor blade 6A), and the first protruding portion 14 is caused to be in contact with the rotor blade 6A. At this time, the first protruding portion 14 may be caused to be in contact with the rotor blade 6A to adjust the attitude of the sensor holding portion 12 with respect to a portion of the rotor blade 6A that faces the casing 8A.

Further, while each of the sensor holding portion 12 and the first protruding portion 14 is caused to be in contact with the rotor blade 6A, measurement of the size Dg of the gap G by the sensor 3 is performed.

In an embodiment, the sensor portion 5 of the sensor 3 held by the sensor holding portion 12 depicted in FIG. 1 and inserted into the gap G is configured to detect the distance $d_2$ between the sensor portion 5 and the inner wall surface of the casing 8A that the sensor portion 5 faces. In this case, by obtaining in advance the thickness $d_1$ of the sensor holding portion 12 holding the sensor 3, it is possible to obtain the size Dg of the gap G between the rotor blade 6A and the casing 8A from the following expression: $Dg=d_1+d_2$.

Accordingly, the measuring jig 2 includes the sensor holding portion 12 and the first protruding portion 14 protruding toward the same side from the base portion 10, at different positions of the base portion 10 (sensor position and the first position), and thus, when the sensor holding portion 12 is inserted into the gap G between the first member 6 and the second member 8 to be measured (in the example depicted in FIG. 1, the rotor blade 6A and the casing 8A), it is possible to cause the first protruding portion 14 to be in contact with the rotor blade 6A, which makes it easier to maintain the attitude of the sensor 3 held by the sensor holding portion 12 with respect to the casing 8A.

Thus, by using the above described measuring jig 2, it is possible to measure the gap G between the rotor blade 6A and the casing 8A accurately, through a simple configuration of providing the first protruding portion 14 protruding from the base portion 10 toward the same side as the sensor holding portion 12.

Next, the measuring jig 2 according to some embodiments will be described in more detail.

Figure 3:
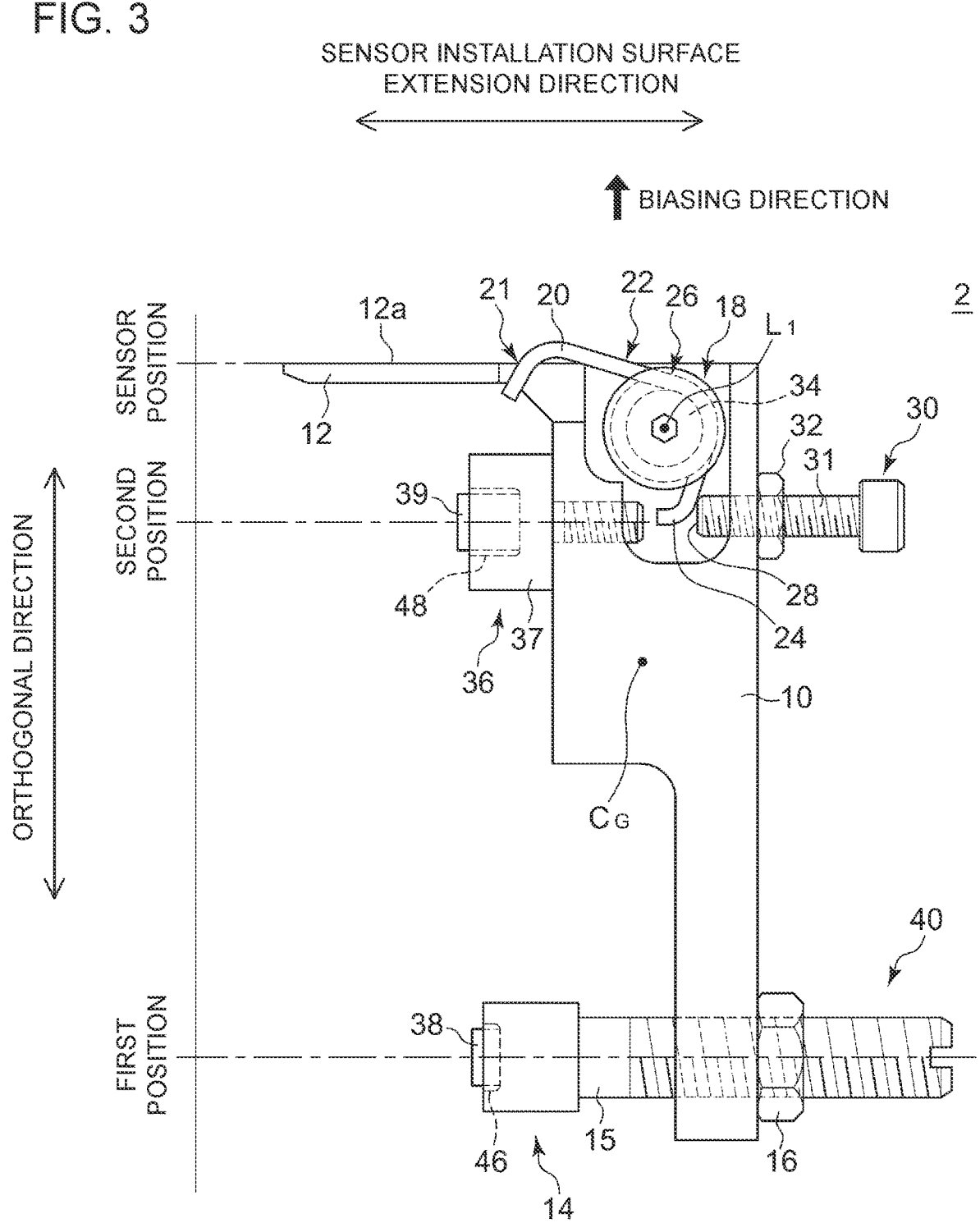
FIG. 3 is a configuration diagram of a measuring jig according to an embodiment.
Figure 4:
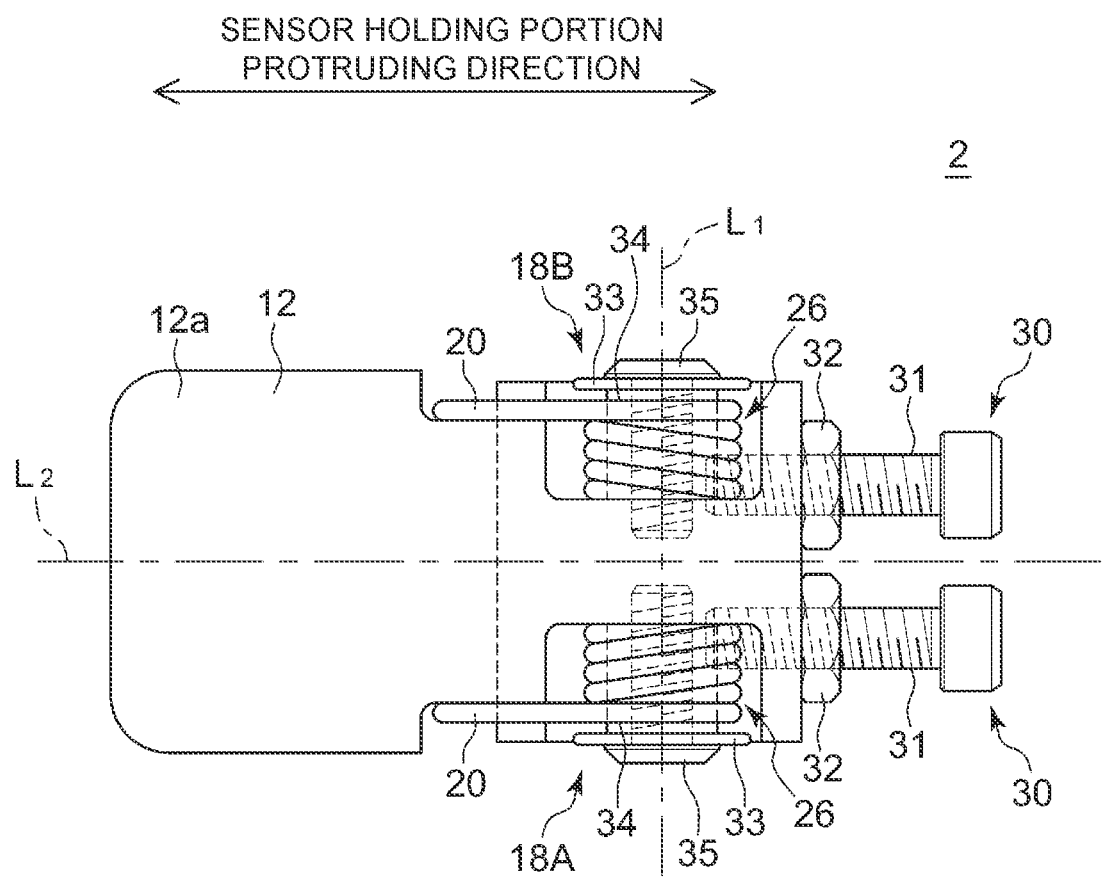
FIG. 4 is a planar configuration view of the measuring jig depicted in FIG. 3.

FIG. 3 is a configuration diagram of a measuring jig 2 according to an embodiment (measuring jig 2 constituting the measuring device 1 depicted in FIG. 1). FIG. 4 is a planar configuration view of the measuring jig 2 depicted in FIG. 3. In FIGS. 3 and 4, installation units 42 are not depicted.

Figure 5:
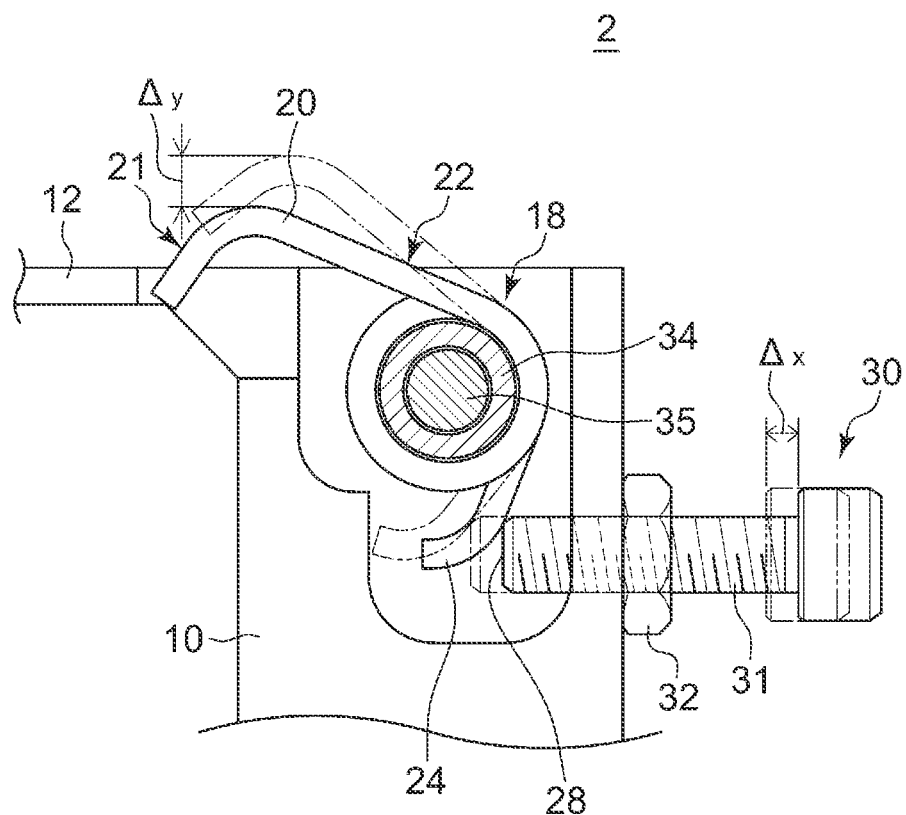
FIG. 5 is a partial enlarged view of the measuring jig depicted in FIG. 3.

Further, FIG. 5 is a partial enlarged view of the measuring jig 2 depicted in FIG. 3.

In some embodiments, the measuring jig 2 includes a movable piece that can be displaced with respect to the base portion 10, and a biasing unit for biasing the movable piece.

The measuring jig 2 depicted in FIGS. 2 and 3 includes a helical torsion spring 18 as the biasing unit. The helical torsion spring 18 is parallel to the sensor installation surface 12a, and is disposed around the line $L_1$ orthogonal to the protruding direction of the sensor holding portion 12 from the base portion 10.

As depicted in FIGS. 4 and 5, a bush 34 is inserted in the radially inner side of the helical torsion spring 18, and a bolt 35 is inserted in the radially inner side of the bush 34 along the line $L_1$. The bolt 35 is partially screwed into a threaded hole formed on the base portion 10. That is, the center position of the helical torsion spring 18 is restricted by the bush 34 or the bolt 35.

Further, a plate 33 is disposed between the head portion of the bolt 35 and the helical torsion spring 18, and the position of the helical torsion spring 18 with respect to the direction along the line $L_1$ is restricted.

The helical torsion spring 18 includes a first arm 20, which is a free end of the helical torsion spring 18, a second arm 24 opposite to the first arm 20, and a coil portion 26 positioned between the first arm 20 and the second arm 24.

The first arm 20 includes a tip portion 21, and a root portion 22 positioned closer to the coil portion 26 than the tip portion 21. The root portion 22 extends from the coil portion 26 toward the opposite side to the first position (see FIG. 3) across the sensor position (see FIG. 3). Further, the tip portion 21 is bended toward the sensor position with respect to the root portion 22.

The tip portion 21 is a movable piece that can be displaced with respect to the base portion 10. The tip portion 21 being a movable piece is configured to be biased by the elastic force of the helical torsion spring 18, toward the opposite side to the first position across the sensor position (in the biasing direction indicated by an arrow in FIG. 3), in a direction orthogonal to the sensor installation surface 12a.

As described above, in a case where the measuring jig 2 includes the tip portion 21 of the first arm 20 being a movable piece and the helical torsion spring 18 being a biasing unit, when the sensor holding portion 12 is inserted in the gap G to be measured, the tip portion 21 of the first arm 20 being a movable piece makes contact with the casing 8A (see FIG. 1) forming the gap G to be measured. Further, at the contact point $P_1$ where the first arm 20 makes contact with the casing 8A, the position of the tip portion 21 (movable piece) is restricted by the casing 8A, and thus the base portion 10 is pressed in a direction away from the casing 8A (direction toward the rotor blade 6A (see FIG. 1) forming the gap G), by the biasing force applied by the helical torsion spring 18. As a result, the sensor holding portion 12 disposed so as to protrude from the base portion 10 becomes pressed against the rotor blade 6A forming the gap G. Accordingly, by pressing the sensor holding portion 12 of the measuring jig 2 against the rotor blade 6A, it is possible to maintain the attitude of the sensor 3 held by the sensor holding portion 12 with respect to the rotor blade 6A more reliably.

Furthermore, in the above described embodiment, the first arm 20 (movable piece) of the helical torsion spring 18 includes a root portion 22 extending from the coil portion 26 toward the opposite side to the first position across the sensor position, and a tip portion 21 bended toward the sensor position from the root portion 22, and the first arm 20 has a bended shape such that the tip portion 21 escapes toward the sensor position. Thus, when the sensor holding portion 12 is inserted into the gap G to be measured, the first arm 20 is less likely to be caught on the inner wall surface of the casing 8A forming the gap G, and it is possible to insert the sensor holding portion 12 smoothly into the gap G.

As depicted in FIG. 4, the measuring jig 2 is, when projected on the sensor installation surface 12a, parallel to the protruding direction of the sensor holding portion 12 from the base portion 10, and includes a pair of helical torsion springs (biasing units 18A, 18B) disposed on both sides across the line $L_2$ passing through the center position of the sensor 3.

Further, like FIGS. 1 and 3, in a side view of the measuring jig 2, either one of the pair of helical torsion springs (18A, 18B) that is visible from the side is depicted as the helical torsion spring 18.

In this case, the pair of helical torsion springs (18A, 18B) are disposed across the line $L_2$ that passes the center position of the sensor 3 and is parallel to the protruding direction of the sensor holding portion 12, which makes it possible to prevent partial contact of the sensor holding portion 12 with the rotor blade 6A (see FIG. 1), and retain the sensor 3 in an appropriate attitude with respect to the rotor blade 6A.

In an embodiment, the base portion 10 of the measuring jig 2 includes a reactive-force receiving surface 28 configured to receive a reacting force of the elastic force of the helical torsion spring 18 by being in contact with the second arm 24. In the embodiment depicted in FIG. 3, the reactive-force receiving surface 28 may be formed by a tip surface of the shaft portion of the bolt 31.

By receiving the reactive force of the elastic force of the helical torsion spring 18 with the reactive-force receiving surface 28 being in contact with the second arm 24, it is possible to apply the elastic force (biasing force) of the helical torsion spring 18 reliably to the first arm 20, when the first arm 20 (movable piece) is caused to be in contact with the rotor blade 6A forming the gap G to be measured. Accordingly, by the elastic force (biasing force) of the helical torsion spring 18, it is possible to press the sensor holding portion 12 reliably in a direction away from the rotor blade 6A (direction toward the rotor blade 6A forming the gap G), together with the base portion 10. Accordingly, by pressing the sensor holding portion 12 of the measuring jig 2 against the rotor blade 6A reliably, it is possible to maintain the attitude of the sensor 3 held by the sensor holding portion 12 with respect to the rotor blade 6A more reliably.

In some embodiments, the measuring jig 2 further includes a spring-force adjusting portion 30 for moving the reactive-force receiving surface 28 and adjusting the position of the first arm 20 being a movable piece in a natural state of the helical torsion spring 18.

In an embodiment, as depicted in FIG. 3, the spring-force adjusting portion 30 includes a bolt 31 screwed in a threaded hole formed on the base portion 10, and a nut 32 screwed with the bolt 31.

With the spring-force adjusting portion 30, it is possible to adjust the position of the first arm 20 when the helical torsion spring 18 is in a natural state. Thus, by using the spring-force adjusting portion 30 to adjust the position of the first arm 20 to a position suitable for the size of the gap G to be measured, it is possible to obtain an appropriate pressing force from the member being in contact with the first arm 20 (e.g. casing 8A in FIG. 1) when the sensor holding portion 12 is inserted in the gap G to be measured. Accordingly, it is possible to maintain the attitude of the sensor 3 held by the sensor holding portion 12 with respect to the member (e.g. rotor blade 6A in FIG. 1) more reliably.

Now, with reference to FIG. 5, adjustment of the position of the first arm 20 by the spring-force adjusting portion 30 will be described.

To adjust the position of the first arm 20 in the natural state of the helical torsion spring 18, the screw amount of the bolt 31 in the base portion 10 is adjusted, and the reactive-force receiving surface 28 being in contact with the second arm 24 of the helical torsion spring 18 (tip surface of the shaft portion of the bolt 31) is moved.

For instance, when the bolt 31 is screwed further by Δx as indicated by the solid line and the double-dotted chain line in FIG. 3, the reactive-force receiving surface 28 also moves in the axial direction by Δx. Furthermore, the second arm 24 of the helical torsion spring 18 being in contact with the reactive-force receiving surface 28 rotary-moves about the center of the helical torsion spring 18, in accordance with the movement of the reactive-force receiving surface 28. Furthermore, in accordance with the rotary movement of the second arm 24, the first arm 20 of the helical torsion spring 18 also rotary-moves about the center of the helical torsion spring 18 like the second arm 24, and the height position of the first arm 20, which is a movable piece, changes by Δy.

Thus, by adjusting the screw amount Δx of the bolt 31, it is possible to adjust the height-directional position of the first arm 20 being a movable piece.

Accordingly, by moving the reactive-force receiving surface 28, it is possible to locate the first arm 20 in a position suitable for the size of the gap to be measured. For instance, to measure a relatively large gap, the height directional position of the first arm 20 may be set to be relatively high. Alternatively, to measure a relatively small gap, the height directional position of the first arm 20 may be set to be relatively low. Accordingly, it is possible to obtain a biasing force of the helical torsion spring 18 suitable for measurement of the gap to be measured, and thereby it is possible to push the sensor holding portion 12 against the member forming the gap to be measured appropriately.

In some embodiments, the measuring jig 2 further includes a spring-position determining portion for determining the position of the center of the helical torsion spring 18.

In the measuring jig 2 depicted in FIGS. 4 and 5, the spring-position determining portion is the bush 34 or the bolt 35 disposed on the radially inner side of the helical torsion spring 18.

In an embodiment, the spring-position determining portion may be, for instance, a bush disposed so as to surround the radially outer side of the helical torsion spring 18, or a guide hole disposed on the base portion 10 so as to surround the radially outer side of the helical torsion spring 18.

Since it is possible to restrict the center position of the helical torsion spring 18 with the spring-position determining portion, it is possible to obtain a pressing force more stably from the member being in contact with the first arm 20 (e.g. casing 8A depicted in FIG. 1), and thus it is possible to maintain the attitude of the sensor held by the sensor holding portion 12 with respect to the member (e.g. rotor blade 6A depicted in FIG. 1) more reliably.

The measuring jig 2 depicted in FIGS. 1 and 3 further includes a second protruding portion 36 protruding from the base portion 10 toward the same side as the sensor holding portion 12, at the second position (see FIG. 3) different from the sensor position and the first position, in the direction orthogonal to the sensor installation surface 12a.

The second protruding portion 36 depicted in FIGS. 1 and 3 includes the head portion of the bolt 37 whose shaft portion is screwed into the threaded hole formed on the base portion 10.

Accordingly, in a case where the second protruding portion 36 protruding toward the same side as the sensor holding portion 12 from the base portion 10 is disposed in the second position different from the sensor position and the first position, it is possible to make the protruding portion 14 and the second protruding portion 36 contact with one of the two members forming the gap G (rotor blade 6A in FIG. 1). Accordingly, it is possible to maintain the attitude of the sensor 3 held by the sensor holding portion 12 with respect to the member (rotor blade 6A in FIG. 1) more easily.

In some embodiments, at least one of the first protruding portion 14 or the second protruding portion 36 may include a magnet.

For instance, as depicted in FIG. 3, the first protruding portion 14 may include a magnet 38 disposed on the recess portion 46 formed on the head portion of the bolt 15. Furthermore, the second protruding portion 36 may include a magnet 39 disposed on the recess portion 48 formed on the head portion of the bolt 37.

As described above, the first protruding portion 14 or the second protruding portion 36 includes the magnet 38 or the magnet 39, and thus it is possible to attract the member forming the gap G to be measured with the magnet 38 or the magnet 39. Accordingly, it is possible to maintain the attitude of the sensor 3 held by the sensor holding portion 12 with respect to the member (e.g. rotor blade 6A in FIG. 1) more reliably.

In some embodiments, the measuring jig 2 further includes a protruding-amount adjusting portion 40 for adjusting the protruding amount of the first protruding portion 14 from the base portion 10.

For instance, in the example depicted in FIG. 3, the protruding-amount adjusting portion 40 includes a bolt 15 screwed in a threaded hole formed on the base portion 10, and a nut 16 screwed with the bolt 15. With the protruding-amount adjusting portion 40, by adjusting the screw amount of the bolt 15 with respect to the threaded hole, it is possible to adjust the protruding amount of the first protruding portion 14.

With the protruding-amount adjusting portion 40, it is possible to adjust the protruding amount of the first protruding portion 14 from the base portion 10 in accordance with the shape of the member on which the sensor holding portion 12 is disposed (e.g. rotor blade 6A in FIG. 1). Accordingly, it is possible to maintain the attitude of the sensor held by the sensor holding portion 12 with respect to the member more reliably. Further, in this way, it is possible to appropriately measure the sizes of gaps formed by members that have different shapes.

The protruding amount of the first protruding portion 14 can be adjusted by adjusting the protruding amount of the magnet 38 from the head portion of the bolt 15 at the first protruding portion 14.

Furthermore, the measuring jig 2 may further include a protruding-amount adjusting portion for adjusting the protruding amount of the second protruding portion 36 from the base portion 10.

In some embodiments, the first protruding portion 14 and the second protruding portion 36 are positioned on different positions in the direction of extension of the sensor installation surface 12a.

For instance, like the rotor blade 6A depicted in FIG. 1, a rotor blade of a typical gas turbine has a blade thickness that gradually changes in the height direction of the rotor blade (in FIG. 1, a direction along the direction orthogonal to the sensor installation surface 12a), and the blade thickness typically decreases toward the tip.

In this regard, with the first protruding portion 14 and the second protruding portion 36 being positioned on different positions in the direction of extension of the sensor installation surface 12a, it is possible to maintain the attitude of the sensor 3 held by the sensor holding portion 12 more reliably, with respect to a member having a varying thickness in a direction orthogonal to the sensor installation surface 12a, like the rotor blade.

By adjusting the protruding amount of the first protruding portion 14 with the protruding-amount adjusting portion 40, the positions of the first protruding portion 14 and the second protruding portion 36 may be differentiated in the direction of extension of the sensor installation surface 12a.

Figure 6:
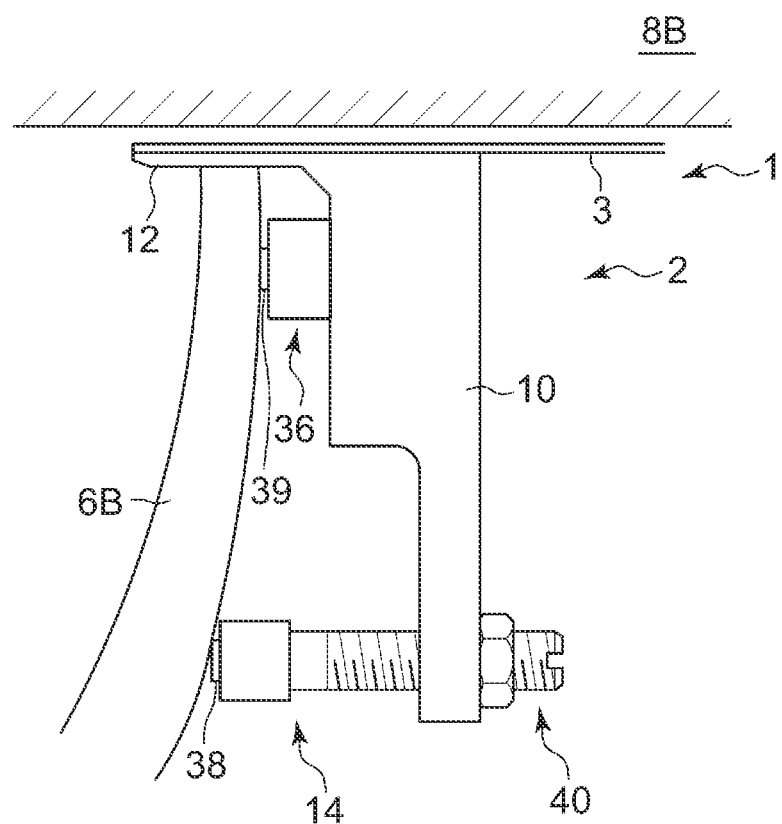
FIG. 6 is a schematic diagram of an application example of a measuring device according to an embodiment.
Figure 9:
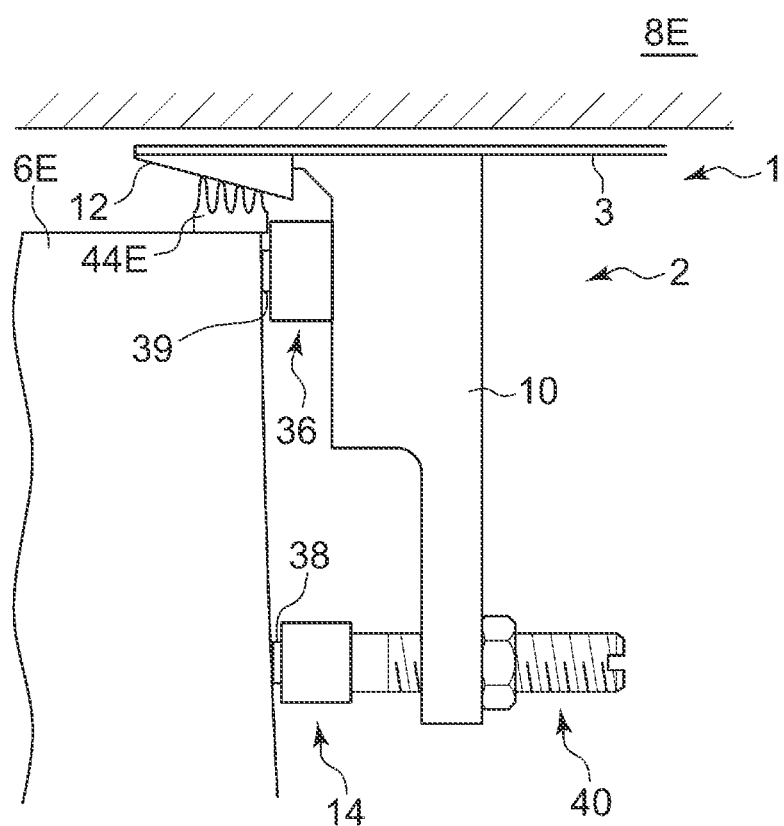
FIG. 9 is a schematic diagram of an application example of a measuring device according to an embodiment.

FIGS. 6 and 9 are each a schematic diagram of an application example of a measuring device using a measuring jig according to an embodiment.

Figure 7:
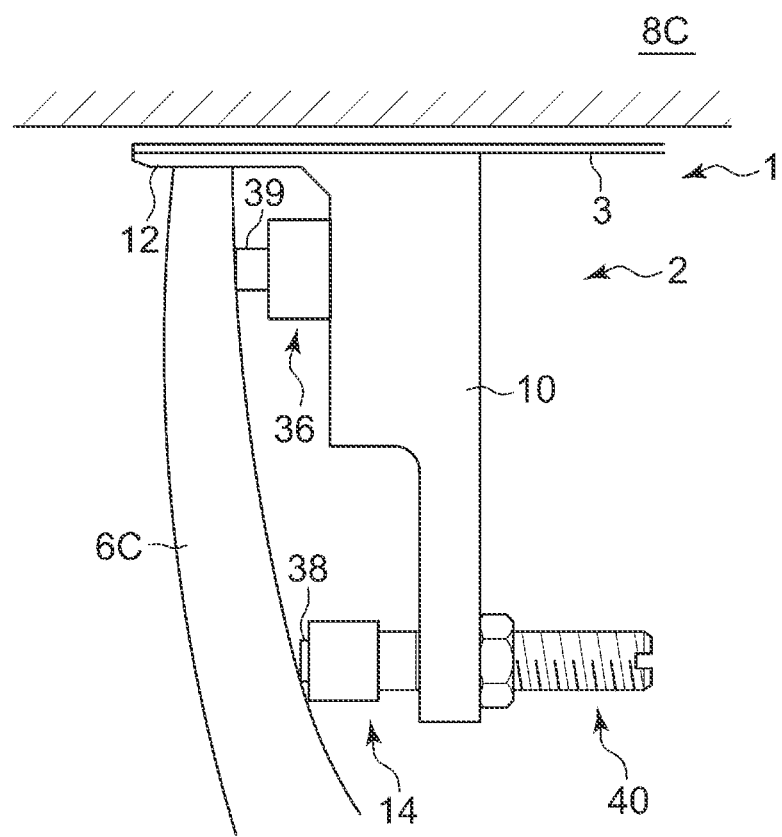
FIG. 7 is a schematic diagram of an application example of a measuring device according to an embodiment.

Of the above drawings, in FIGS. 6 and 7, a measuring device 1 is depicted, which is to be applied to measurement of the gap between the rotor blade 6B or 6C of the gas turbine having a different shape from the example depicted in FIG. 1, and the casing 8B or 8C of the gas turbine.

The rotor blade 6B depicted in FIG. 6 has a cross section, in the blade-thickness direction, having a convex curved shape toward the base portion 10 of the measuring jig 2. On the other hand, the rotor blade 6C depicted in FIG. 7 has a cross section, in the blade-thickness direction, having a convex curved shape opposite to the base portion 10 of the measuring jig 2.

In a case where the first member 6 to be measured has a curved shape as described above, by adjusting the protruding amount of the first protruding portion 14 and/or the second protruding portion 36 so as to suit the shape of the first member 6, it is possible to maintain the attitude of the sensor holding portion 12 and the sensor 3 with respect to the first member 6 more reliably.

Figure 8:
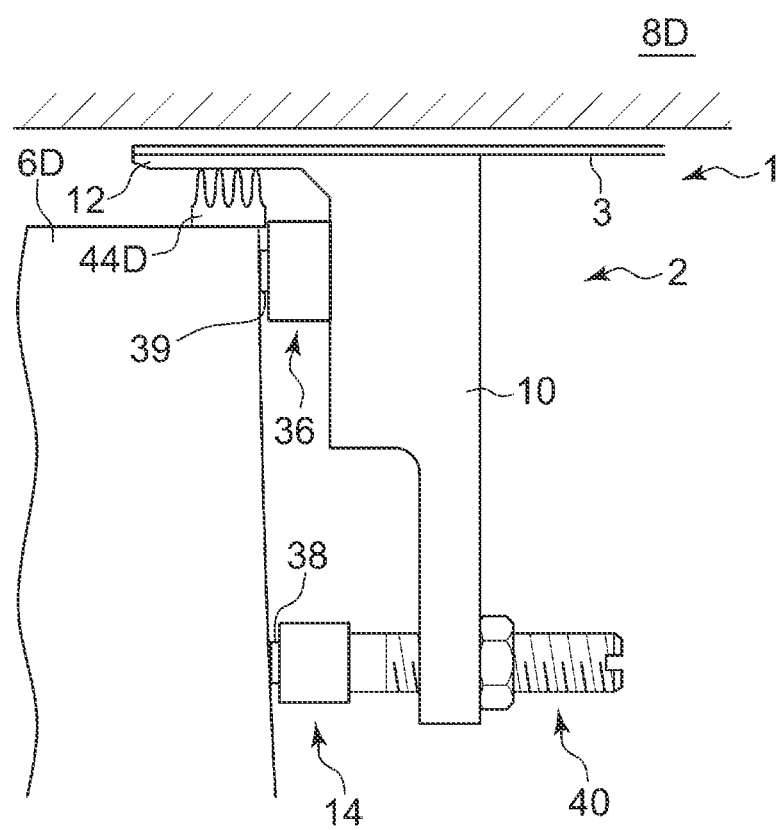
FIG. 8 is a schematic diagram of an application example of a measuring device according to an embodiment.

Further, in FIGS. 8 and 9, a measuring device 1 is depicted, which is to be applied to measurement of the gap between a seal fin 44D or 44E disposed on the tip of the rotor blade 6D or 6E of the steam turbine, and the casing 8D or 8E of the steam turbine.

Accordingly, the measuring jig 2 and the measuring device 1 according to some embodiments are capable of measuring the gap between members other than the rotor blade and the casing of the gas turbine.

Further, in FIG. 9, the tip portion of the seal fin 44E is disposed so as to be slant with respect to the blade thickness direction (that is, the seal fin 44 is a slant seal fin). In this case, as depicted in FIG. 9, the sensor holding portion 12 that faces the tip of the seal fin 44E may have a shape conforming to the slant of the seal fin 44E. Accordingly, of the first member 6 forming the gap to be measured (herein, the rotor blade 6E including the seal fin 44E), by using the sensor holding portion conforming to the shape of a portion that faces the sensor holding portion 12, it is possible to maintain the attitude of the sensor holding portion 12 and the sensor 3 with respect to the first member 6 more reliably.

In some embodiments, as depicted in FIG. 3, in the measuring jig 2, the first position where the first protruding portion 14 protrudes from the base portion 10 exists on the opposite side to the sensor position across the gravity center $C_G$ of the measuring jig 2, in a direction orthogonal to the sensor installation surface 12a.

As described above, with the first protruding portion 14 protruding from the first position that exists on the opposite side to the sensor position across the gravity center $C_G$ of the measuring jig 2, the distance to the first protruding portion 14 from the contact point between the sensor holding portion 12 and the first member forming the gap G to be measured (rotor blade 6A in FIG. 1) becomes relatively large, and thus, around the contact point, it is possible to cancel the moment due to the weight of the measuring jig 2 with the moment due to the force of pushing the first protruding portion 14 back from the first member. Thus, it is possible to stabilize the attitude of the measuring jig 2 even further.

Figure 10:
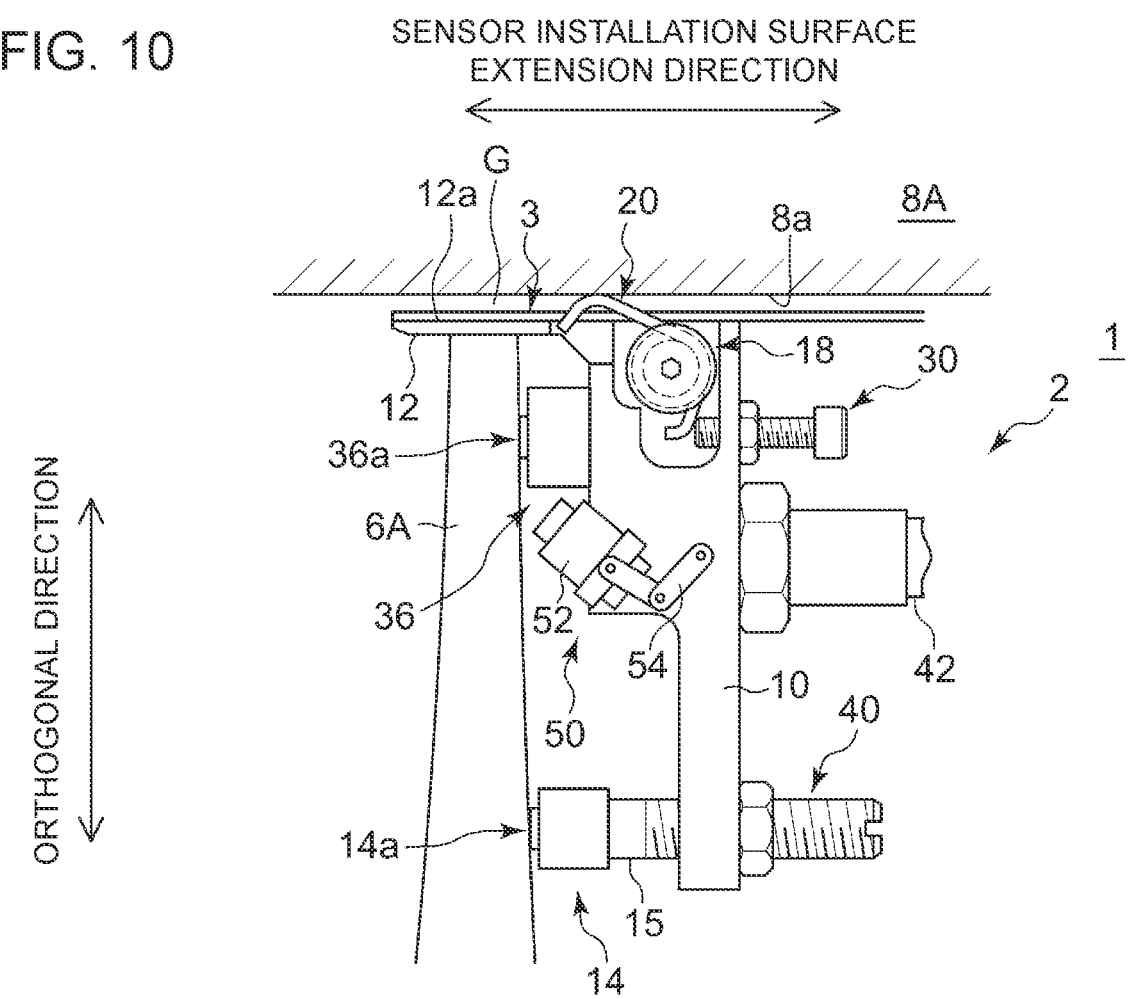
FIG. 10 is a configuration diagram of a measuring device according to an embodiment.
Figure 11:
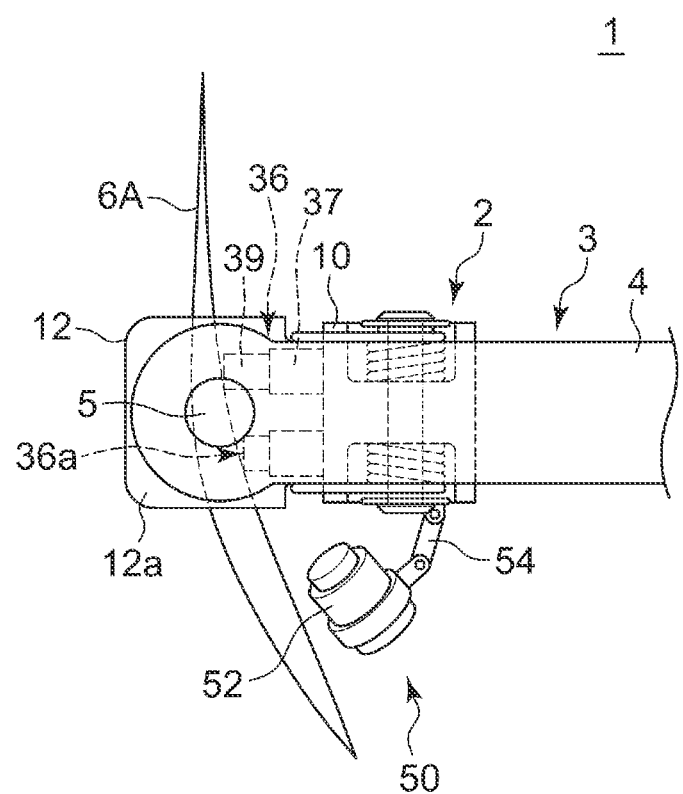
FIG. 11 is a planar view of the measuring device depicted in FIG. 10.
Figure 13:
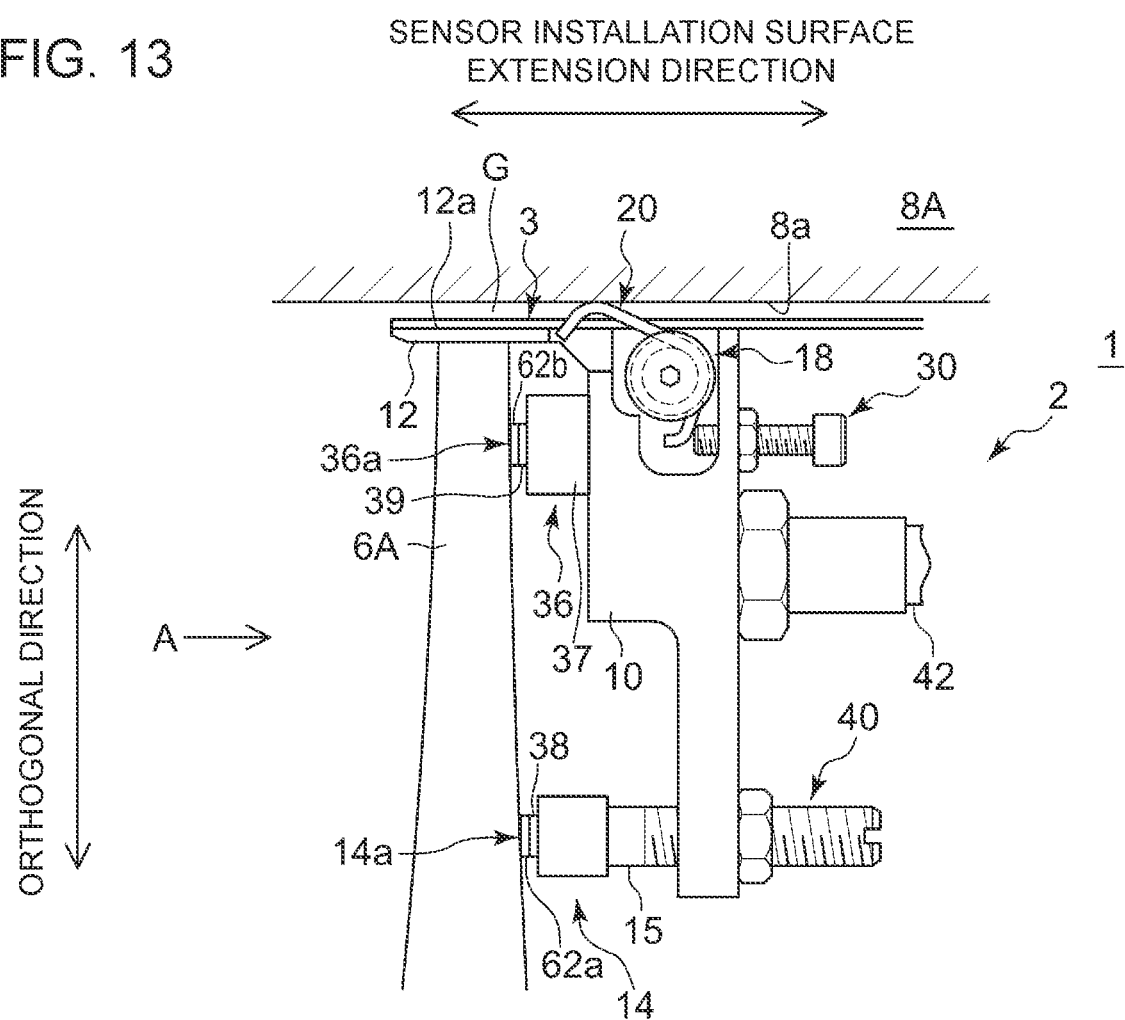
FIG. 13 is a configuration diagram of a measuring device according to an embodiment.
Figure 14:
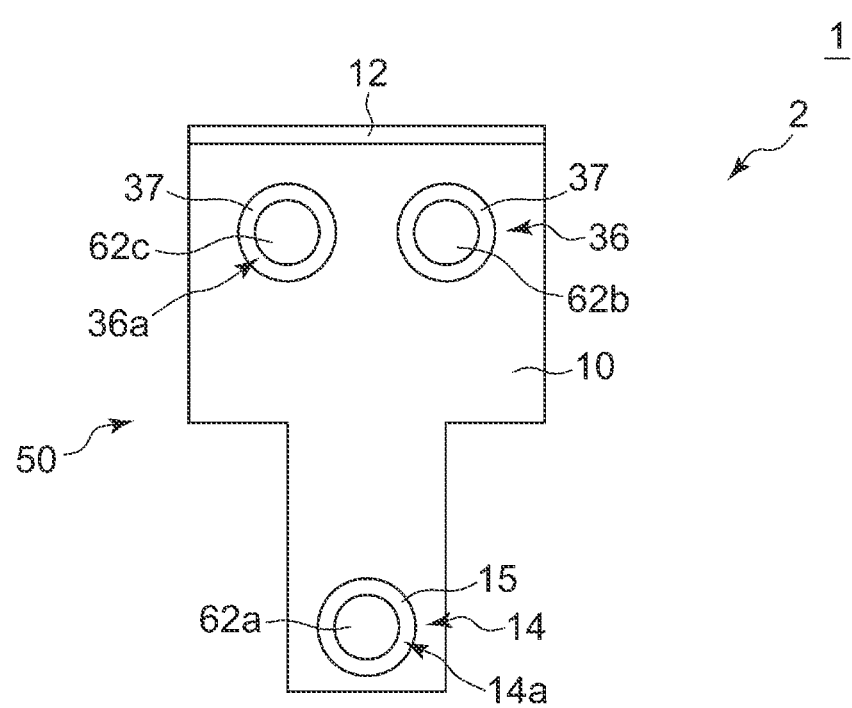
FIG. 14 is a view of the measuring device depicted in FIG. 13, as seen from the direction A.

FIGS. 10 and 14 are each a configuration diagram of a measuring device according to an embodiment. FIG. 11 is a planar view of the measuring device depicted in FIG. 10. Furthermore, FIG. 14 is a view of the measuring device depicted in FIG. 13, as seen from the direction A (see the arrow in FIG. 13).

In some embodiments, as shown in FIGS. 10 to 14, the measuring device 1 further includes a contact detecting portion 50. The contact detecting portion 50 is configured to detect contact between at least one protruding portion, of at least one protruding portion of the measuring jig 2 (the first protruding portion 14 and the second protruding portion 36 in the depicted example), and the member to be in contact with the sensor holding portion 12, of the first member 6 or the second member 8 forming the gap G to be measured (in the depicted example, the rotor blade 6A, which is the first member 6).

Figure 12:
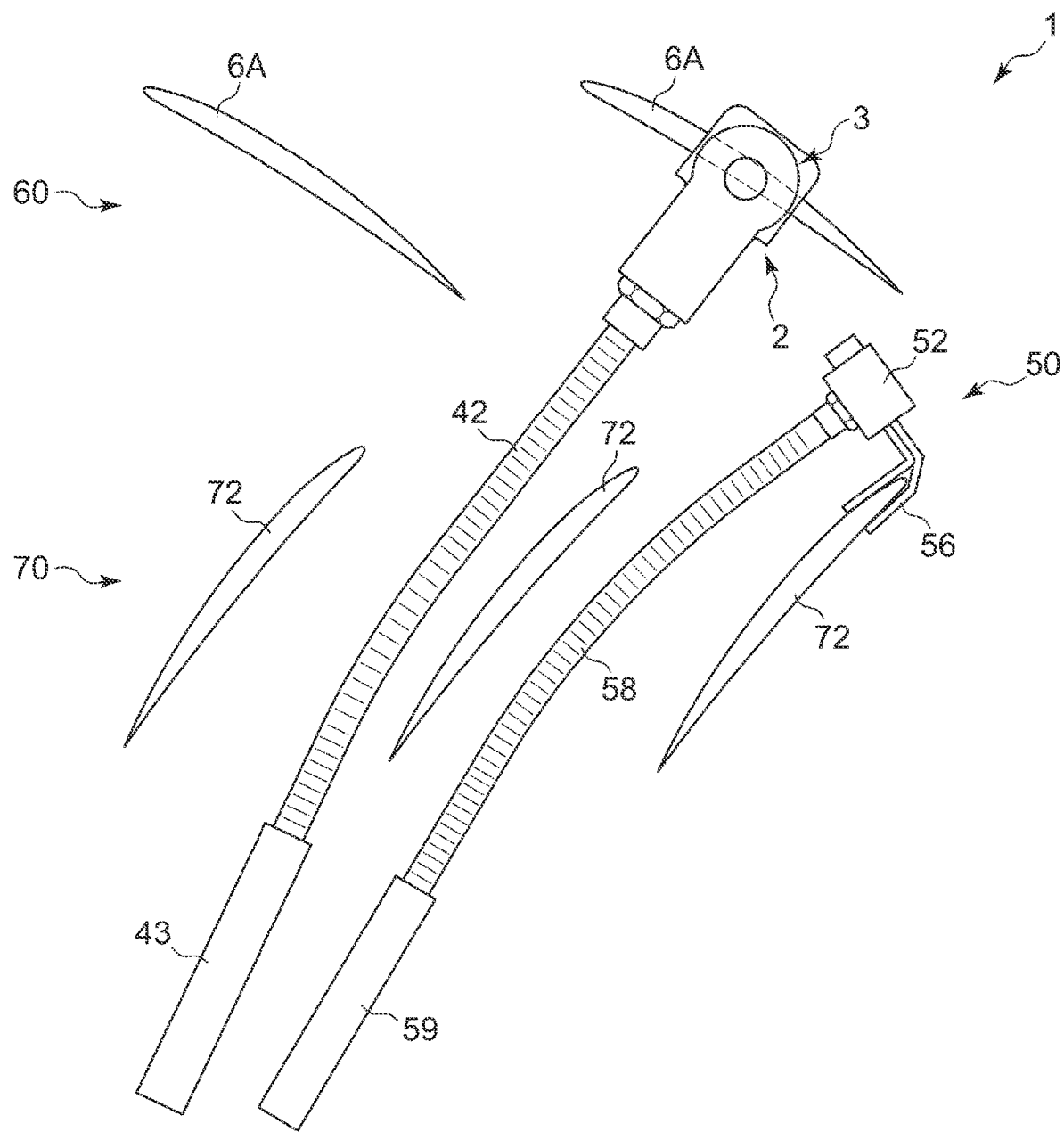
FIG. 12 is a configuration diagram of a measuring device according to an embodiment.

In the exemplary embodiment depicted in FIGS. 10 to 12, the contact detecting portion 50 includes a camera 52 (image capturing portion) configured to capture an image of the tip portion of the second protruding portion 36, and a portion of the rotor blade 6A (first member 6) that the tip portion 36a of the second protruding portion 36 faces. Furthermore, in the embodiment depicted in FIGS. 13 and 14, the contact detecting portion 50 includes contact sensors 62a, 62b configured to detect contact between the tip portions 14a, 36a of the first protruding portion 14 and the second protruding portion 36, and portions of the rotor blade 6A (first member 6) that the tip portions 14a, 36a of the first protruding portion 14 and the second protruding portion 36 face.

With the contact detecting portion 50, it is possible to measure the gap G with the measuring device 1, while confirming that the protruding portion (the first protruding portion 14 or the second protruding portion 36) of the measuring jig 2 is in contact with the first member 6 (rotor blade 6A). Thus, it is possible to measure the gap G accurately and more reliably.

For instance, in a case where the measuring jig 2 has a plurality of protruding portions (e.g. the first protruding portion 14 and the second protruding portion 36 in the depicted embodiment), in a state where the sensor holding portion 12 is in contact with the tip portion of the rotor blade 6A (portion that faces the casing 8A), an operator of the measuring device 1 can sensuously determine whether the rotor blade 6A is in contact with one of plurality of protruding portions (e.g. the first protruding portion 14). However, when a protruding portion (e.g. the first protruding portion 14) is in contact with the rotor blade 6A, it is difficult for the operator of the measuring device 1 to sensuously determine whether the rotor blade 6A is in contact with another protruding portion (e.g. the second protruding portion 36) other than the protruding portion that is in contact with the rotor blade 6A.

Even in this case, with the contact detecting portion 50, it is possible to measure the gap G with the measuring device 1, while confirming that the protruding portion (the first protruding portion 14 or the second protruding portion 36) of the measuring jig 2 is in contact with the rotor blade 6A. Thus, it is possible to measure the gap G accurately and more reliably.

In the exemplary embodiment depicted in FIGS. 10 to 12, the contact detecting portion 50 includes a camera 52 (imaging capturing portion) configured to capture an image of the tip portion 36a of the second protruding portion 36, and a portion of the rotor blade 6A (first member 6) that the tip portion 36a of the second protruding portion 36 faces. The image captured by the camera 52 is output to a non-depicted image-receiving/displaying device. By visually recognizing the image displayed on the image-receiving/displaying device, it is possible to confirm the contact state between the rotor blade 6A and the tip portion 36a of the second protruding portion 36 of the measuring jig 2.

The camera 52 depicted in FIGS. 10 and 11 is mounted to the base portion 10 of the measuring jig 2 via the arm 54, and is capable of adjusting the position and the direction of the camera 52 by moving the arm 54. With the camera 52, by capturing the image of the tip portion 36a of the second protruding portion 36 and the portion of the rotor blade 6A that faces the tip portion 36a, it is possible to detect whether the rotor blade 6A is in contact with the tip portion 36a of the second protruding portion 36.

In the embodiment depicted in FIG. 12, a plurality of rotor blades 6A are arranged in the circumferential direction of the rotor to form a blade row 60, and a plurality of stator vanes 72 are arranged in the circumferential direction of the rotor to form a vane row 70. The blade row 60 and the vane row 70 are arranged so as to be adjacent to one another in the rotor axial direction.

The camera 52 depicted in FIG. 12 is mounted to a blade or vane other than the rotor blade 6A forming the gap G to be measured (first member 6), that is, the rotor blade 6A on which the measuring jig 2 is disposed. More specifically, the camera 52 depicted in FIG. 12 is mounted to a stator vane 72 constituting the vane row 70 adjacent to the blade row 60 formed by the rotor blade 6A with the measuring jig 2, via a clip 56.

In this embodiment, the measuring jig 2 and the camera 52 are connected to handles 43, 59, respectively, via flexible arms (installation units 42, 58). The operator can operate the position and the direction of the measuring jig 2 and the camera 52 by directly holding the handles 43, 59 by hands, or by operating the flexible arms (installation units 42, 58) with a robot or the like.

With the camera 52, by capturing an image of the tip portion 36a of the second protruding portion 36 and the portion of the rotor blade 6A that faces the tip portion 36a, it is possible to detect whether the rotor blade 6A is in contact with the tip portion 36a of the second protruding portion 36.

Furthermore, in the embodiment depicted in FIGS. 13 and 14, the contact detecting portion 50 includes contact sensors 62 to 62c disposed on the tip portions 14a, 36a of the first protruding portion 14 and the second protruding portion 36. The contact sensors 62a to 62c may be disposed on the surfaces of the magnets 38, 39 (see FIG. 3) forming the tip portions 14a, 36a of the first protruding portion 14 and the second protruding portion 36, respectively.

The contact sensors 62 a to 62c may be button-type contact sensors that sense contact between the rotor blade 6A and the tip portions 14a, 36a of the first protruding portion 14 and the second protruding portion 36, through the pressure received from the rotor blade 6A (first member 6).

In this case, the contact sensors 62a to 62c are connected to different lamps, and corresponding one of the lamps may light up when one of the contact sensors 62a to 62c detects contact between the rotor blade 6A and the tip portion 14a or 36a of the first protruding portion 14 or the second protruding portion 36.

Alternatively, the contact sensors 62a to 62c may be connected to one lamp, and the lamp may light up when one of the contact sensors 62a to 62c detects contact between the rotor blade 6A and the tip portion 14a or 36a of the first protruding portion 14 or the second protruding portion 36.

Accordingly, from the lamp turning on and off, it is possible to confirm whether the rotor blade 6A is in contact.

In a case where the first protruding portion 14, the second protruding portion 36, and the base portion 10 of the measuring jig 2 are formed from a conductive material (e.g. alloy), the contact sensors 62a to 62c may each include an electrode, and the contact detecting portion 50 may be configured to detect conduction of electricity between two of the electrodes. For instance, the contact detecting portion 50 may be configured to detect conduction of electricity between the contact sensor 62a and the contact sensor 62b, or between the contact sensor 62a and the contact sensor 62c.

That is, for instance, when voltage is applied to between the electrode of the contact sensor 62a and the electrode of the contact sensor 62b, if conduction of electricity is detected between the electrodes, it is possible to confirm that the first protruding portion 14 including the contact sensor 62a is in contact with the rotor blade 6A (first member 6), and the second protruding portion 36 including the contact sensor 62b is in contact with the rotor blade 6A.

Furthermore, for instance, when voltage is applied to between the electrode of the contact sensor 62a and the electrode of the contact sensor 62c, if conduction of electricity is detected between the electrodes, it is possible to confirm that the first protruding portion 14 including the contact sensor 62a is in contact with the rotor blade 6A (first member 6), and the second protruding portion 36 including the contact sensor 62c is in contact with the rotor blade 6A.

As described above, with the contact detecting portion 50, it is possible to measure the gap G with the measuring device 1, while confirming that the protruding portion (the first protruding portion 14 or the second protruding portion 36) of the measuring jig 2 is in contact with the first member 6 (rotor blade 6A).

Embodiments of the present invention were described in detail above, but the present invention is not limited thereto, and various amendments and modifications may be implemented.

For instance, in the example according to the above described embodiments, the measuring jig 2 and the measuring device 1 are applied to measurement of tip clearance of the rotor blade of a gas turbine or a steam turbine. Nevertheless, measurement target of the measuring jig 2 and the measuring device 1 according to the present invention is not limited to this, and the measuring jig 2 and the measuring device 1 according to the present invention may be used to measure the gap between members of various machines.

Further, in the above described embodiments, for example, the measuring jig 2 includes the tip portion 21 of the helical torsion spring 18 as a movable piece that can be displaced with respect to the base portion 10, and includes the helical torsion spring 18 as a biasing unit for biasing the movable piece (tip portion 21) toward the opposite side to the first position across the sensor position. Nevertheless, the measuring jig 2 according to the present invention is not limited to the above embodiments.

Although not depicted, for instance, in another embodiment, the measuring jig 2 may include a plunger configured to be capable of being displaced in a direction orthogonal to the sensor installation surface 12a, as a movable piece that can be displaced with respect to the base portion 10, and a biasing unit capable of biasing the plunger toward the opposite side to the first position across the sensor position.

In this case, the measuring jig 2 may include, as a biasing unit for biasing the plunger, a coil spring that can generate an elastic force in a direction orthogonal to the sensor installation surface 12a (see FIG. 1). Furthermore, the measuring jig 2 may include a spring-force adjusting portion (e.g. spring-force adjusting screw) for adjusting the position of the plunger when the coil spring is in a natural state. By using the spring-force adjusting portion to adjust the position of the plunger to a position suitable for the size of the gap G to be measured, it is possible to obtain an appropriate pressing force from the member being in contact with the plunger, when the sensor holding portion 12 is inserted in the gap G to be measured.

Alternatively, the measuring jig 2 having the above described plunger as a movable piece may include, as a biasing unit for biasing the plunger, a fluid pressure generating mechanism for biasing the plunger with a fluid pressure. In this case, the plunger may be biased by water pressure, oil pressure, or air pressure, by using a fluid pressure generating mechanism whose working fluid of water, oil, or air, for instance.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

1 Measuring device
2 Measuring jig
2 Sensor
4 Arm portion
5 Sensor portion
6 First member
6A to 6E Rotor blade
8 Second member
8A to 8E Casing
10 Base portion
12 Sensor holding portion
12a Sensor installation surface
14 First protruding portion
14a Tip portion
15 Bolt
16 Nut
18 Helical torsion spring
20 First arm
21 Tip portion
22 Root portion
24 Second arm
26 Coil portion
28 Reactive-force receiving surface
30 Spring-force adjusting portion
31 Bolt
32 Nut
33 Plate
34 Bush
35 Bolt
36 Second protruding portion
36a Tip portion
37 Bolt
38 Magnet
39 Magnet
40 Protruding-amount adjusting portion
42 Installation unit
43 Handle
44D, 44E Seal fin
46 Recess portion
48 Recess portion
50 Contact detecting portion
52 Camera
54 Arm
56 Clip
58 Installation unit
59 Handle
60 Blade row
62a to 62c Contact sensor
70 Vane row
72 Stator vane
$C_G$ Gravity center
G Gap
$P_1$ Contact point

The invention claimed is:

1. A measuring jig, comprising:
a base portion;
a sensor holding portion disposed so as to protrude from the base portion and configured to hold a sensor; and
a first protruding portion protruding from the base portion toward the same side as the sensor holding portion, at a first position different from a sensor position which is a position of a sensor installation surface on which the sensor extends, with respect to a direction orthogonal to the sensor installation surface.

2. The measuring jig according to claim 1, further comprising:
a movable piece disposed so as to be capable of being displaced with respect to the base portion; and
at least one biasing unit configured to bias the movable piece toward an opposite side to the first position across the sensor position, in the direction orthogonal to the sensor installation surface.

3. The measuring jig according to claim 2,
wherein the at least one biasing unit includes a pair of biasing units which are parallel to a protruding direction of the sensor holding portion from the base portion when projected on the sensor installation surface, and positioned on opposite sides of a line passing through a center position of the sensor.

4. The measuring jig according to claim 2,
wherein the at least one biasing unit includes a helical torsion spring disposed around a line which is parallel to the sensor installation surface and which is orthogonal to a protruding direction of the sensor holding portion from the base portion, and
wherein the helical torsion spring includes a first arm having a tip portion as the movable piece.

5. The measuring jig according to claim 4,
wherein the helical torsion spring further includes:
a second arm disposed opposite to the first arm; and
a coil portion positioned between the first arm and the second arm, and
wherein the first arm includes:
a root portion extending from the coil portion toward an opposite side to the first position across the sensor position; and
the tip portion bended toward the sensor position with respect to the root portion.

6. The measuring jig according to claim 4,
wherein the helical torsion spring includes a second arm disposed opposite to the first arm, and
wherein the base portion includes a reactive-force receiving surface configured to be in contact with the second arm and receive a reactive force of an elastic force of the helical torsion spring.

7. The measuring jig according to claim 6, further comprising:
a spring-force adjusting portion for moving the reactive-force receiving surface and adjusting a position of the first arm as the movable piece in a natural state of the helical torsion spring.

8. The measuring jig according to claim 4, further comprising:
a spring position determining portion for determining a position of a center of the helical torsion spring.

9. The measuring jig according to claim 1, further comprising:
a second protruding portion protruding from the base portion toward the same side as the sensor holding portion, at a second position different from the sensor position and the first position, in the direction orthogonal to the sensor installation surface.

10. The measuring jig according to claim 1,
wherein the first protruding portion includes a magnet.

11. The measuring jig according to claim 1, further comprising:
a protruding-amount adjusting portion for adjusting a protruding amount of the first protruding portion from the base portion.

12. The measuring jig according to claim 1,
wherein the first position exists on an opposite side to the sensor position across a gravity center of the measuring jig, in the direction orthogonal to the sensor installation surface.

13. The measuring jig according to claim 1,
wherein the sensor holding portion is configured to, while being inserted in a gap between a first member and a second member to be measured by the sensor, make contact with a portion of the first member which faces the second member, and
wherein the first protruding portion is configured to make contact with the first member and adjust an attitude of the sensor holding portion with respect to the portion of the first member.

14. A measuring device, comprising:
the measuring jig according to claim 1; and
a sensor held on the sensor holding portion of the measuring jig.

15. The measuring device according to claim 14,
wherein the measuring jig includes at least one protruding portion protruding from the base portion toward the same side as the sensor holding portion, at a different position from the sensor position with respect to a direction orthogonal to the sensor installation surface,
wherein the sensor holding portion is configured to, while being inserted in a gap between a first member and a second member to be measured by the sensor, make contact with a portion of the first member which faces the second member, and
wherein the measuring device further comprises a contact detecting portion for detecting contact between the first member and at least one protruding portion of the at least one protruding portion.

16. The measuring device according to claim 15,
wherein the contact detecting portion includes an image capturing portion configured to capture an image of a tip portion of the at least one protruding portion and a portion of the first member facing the tip portion of the at least one protruding portion.

17. The measuring device according to claim 15,
wherein the contact detecting portion includes a contact sensor configured to detect contact between a tip portion of the at least one protruding portion and a portion of the first member facing the tip portion of the at least one protruding portion.

18. A gap measuring method, comprising:
a step of causing a sensor mounted to a measuring jig to enter a gap between a first member and a second member, and measuring a size of the gap with the sensor,
wherein the measuring jig includes:
a base portion;
a sensor holding portion disposed so as to protrude from the base portion and configured to hold the sensor; and
a first protruding portion protruding from the base portion toward the same side as the sensor holding portion, at a first position different from a sensor position which is a position of a sensor installation surface on which the sensor extends, with respect to a direction orthogonal to the sensor installation surface, and
wherein the step of measuring the size of the gap includes causing the sensor holding portion to make contact with a portion of the first member which faces the second member, and performing measurement by the sensor in a state where the first protruding portion is in contact with the first member.

* * * * *